Feb. 28, 1961  A. M. WHITE  2,973,220
PLASTIC CAR BODY AND METHOD OF MANUFACTURING SAME
Filed April 2, 1959  3 Sheets-Sheet 1
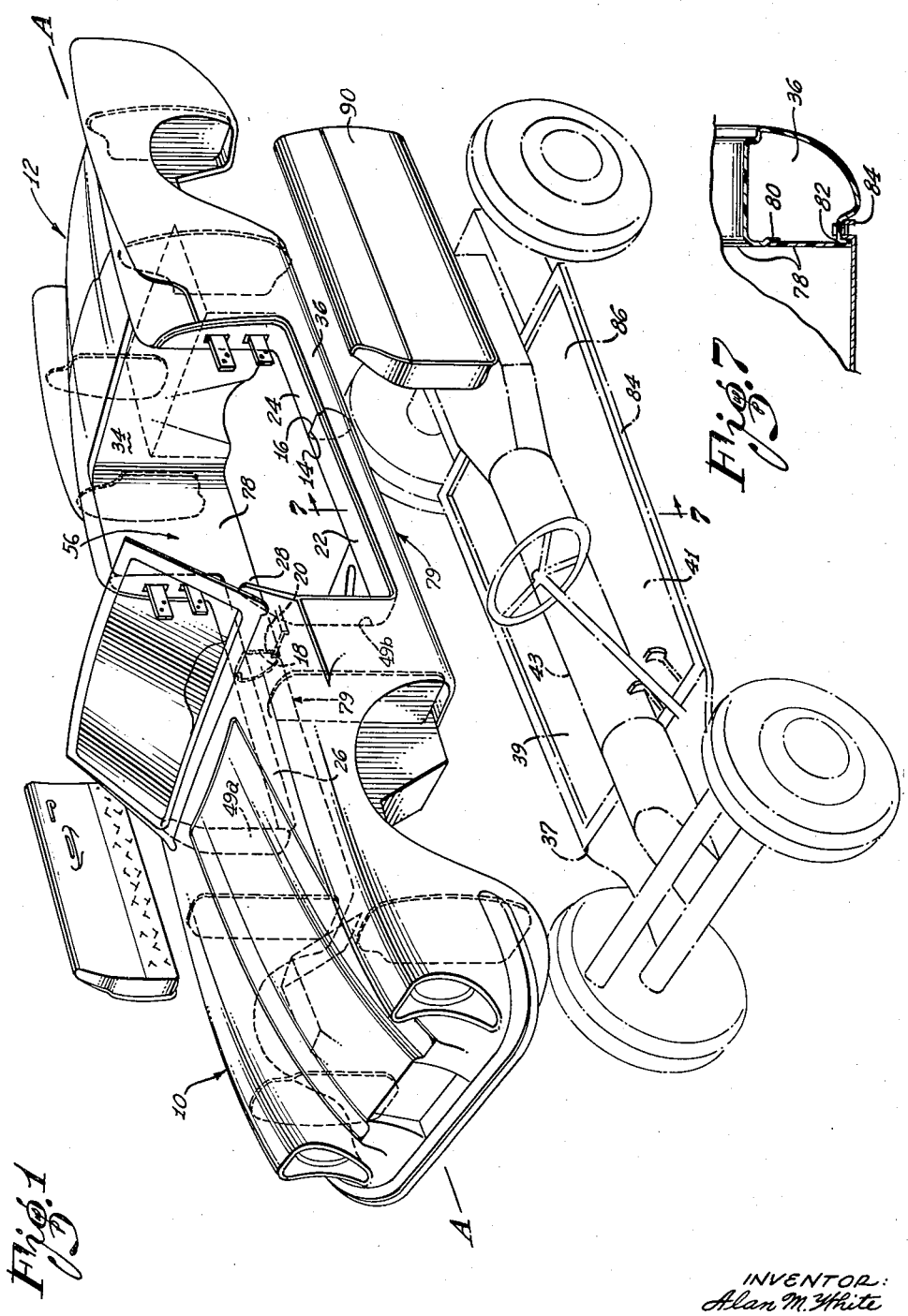
INVENTOR:
Alan M. White
By Smyth & Roston
Attorneys Feb. 28, 1961  A. M. WHITE  2,973,220
PLASTIC CAR BODY AND METHOD OF MANUFACTURING SAME
Filed April 2, 1959  3 Sheets-Sheet 2
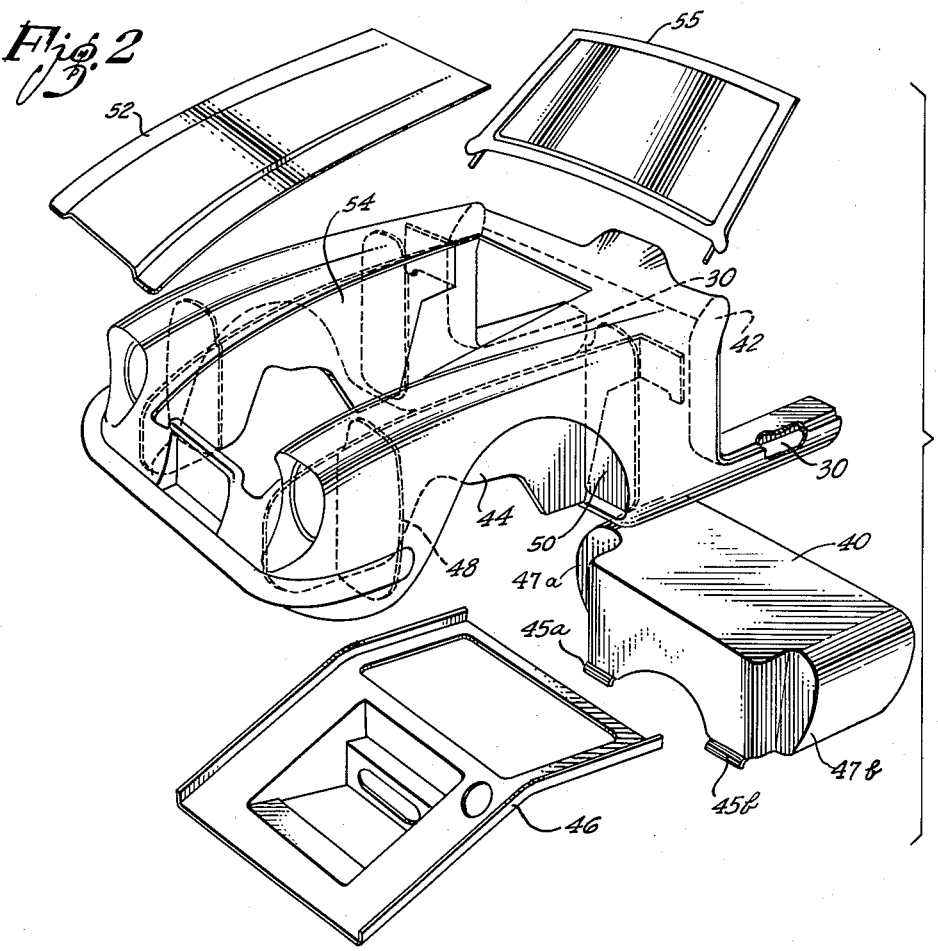
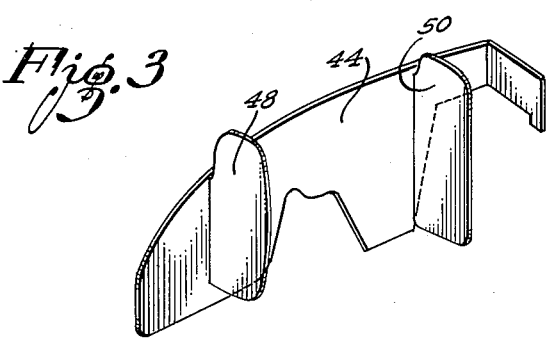
INVENTOR
Alan M. White
By Smyth & Roston
Attorneys Feb. 28, 1961 A. M. WHITE 2,973,220
PLASTIC CAR BODY AND METHOD OF MANUFACTURING SAME
Filed April 2, 1959 3 Sheets-Sheet 3
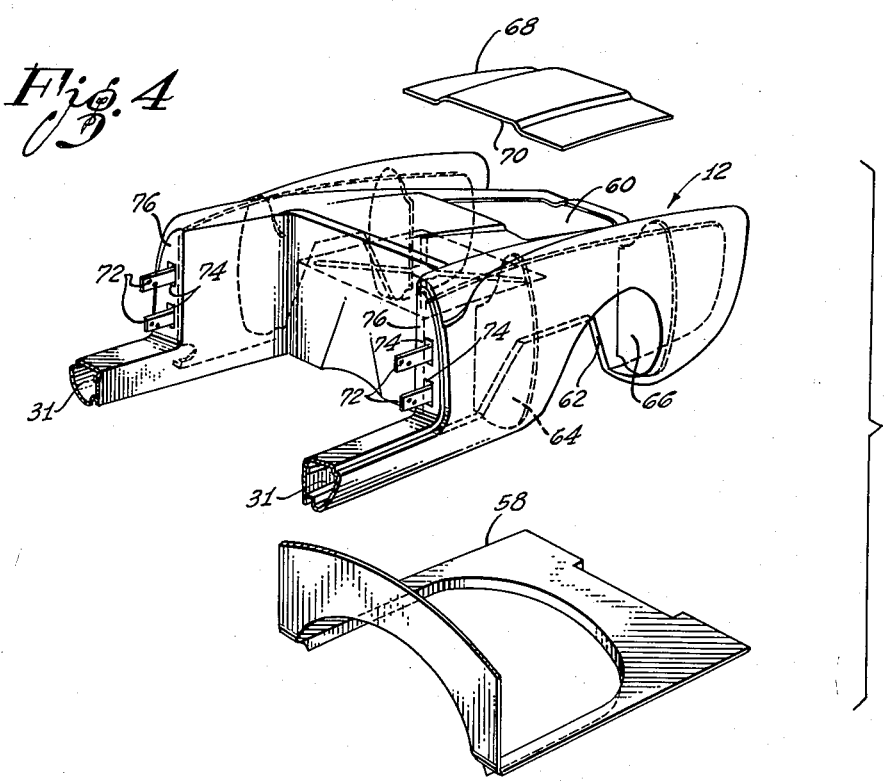
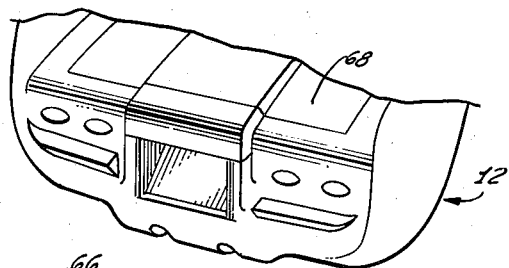
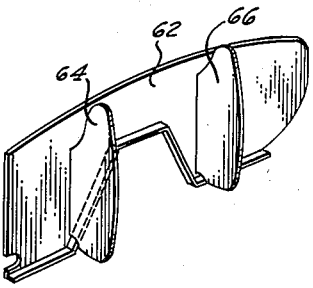
INVENTOR:
Alan M. White
By Smyth & Roston
Attorneys United States Patent Office 2,973,220
Patented Feb. 28, 1961

2,973,220

PLASTIC CAR BODY AND METHOD OF MANUFACTURING SAME

Alan M. White, 236 Tranquillo Road, Pacific Palisades, Calif.

Filed Apr. 2, 1959, Ser. No. 803,649

7 Claims. (Cl. 296—31)

This invention relates to plastic car bodies for automobiles, and to a novel method of fabricating and assembling the same.

The fabrication of car bodies from synthetic resin materials has commanded a great deal of attention in recent years and, as a consequence, there have evolved many different types of plastic car bodies and many different techniques for fabricating the same and securing them to automobile chassis.

One of the problems in fabricating plastic car bodies arises from a desire to limit the size of the mould or moulds in which the body shell is formed, in order to facilitate handling of the moulds during lay-up of the synthetic resin material in the moulds. As is well understood by those skilled in the art of laying up synthetic resin materials, such as polyester, each area of the mould which is being laid up at any particular instant should be disposed in a horizontal plane to minimize the downward flow of resin from inclined surfaces, since such flow produces resin-starved or thin spots in the section of the part being moulded. To avoid such resin flow, the mould and the body section being laid up desirably should be adapted to being manipulated to enable them to be disposed in the optimum attitudes during the laying-up process. This may be accomplished either by limiting the size of the mould so that it can readily be tilted about by the laying-up personnel, or a large cradle must be built to hold the mould and to enable the laminators mechanically to manipulate the mould into the desired dispositions.

Another problem in car body moulding arises from the fact that each part of the body which is moulded must be of such a configuration that it may be readily released from the mould. Where the shape of the part is such that it cannot be removed from the mould, then the mould must be constructed in a plurality of sections which are then bolted or otherwise disengageably secured together. After lay-up of the resin, these sections are then dismantled and the moulded part released.

There may be some parts, however, such as a tubular support element which cannot be conveniently moulded as a single piece; yet such an element may be a desirable and even necessary part of a plastic car body.

While there have been attempts to fabricate plastic car bodies by separately moulding different sections such as side panels, rear ends, tops, fenders and hoods, and then joining such sections into a complete body, the use of such separately moulded sections generally has required the construction of some special framing by which these sections may be put together into a single unit of desired configuration, and mounted upon the automobile chassis. Further, joining sections of this type requires considerable care and labor time to insure smooth external junctures, and the strength of a body thus assembled is largely dependent upon the strength of the special framing. The weight of adequate framing, however, may be such as to reduce greatly any weight savings which are expected to be realized in using synthetic resins for the body shell.

Another problem encountered in plastic car body construction arises in connection with efforts to provide good longitudinal rigidity and strength. Heretofore, efforts have been directed largely to providing various types of internal longitudinal support members which increase the car weight and its expense, and complicate fabrication and assembly of the car body.

A still further problem arises in connection with providing adequate means to secure the plastic body to the automobile chassis, and in providing a suitable lower transverse wall for the driver's cockpit or passenger compartment.

The present invention solves all of the foregoing problems by providing a car body which is formed essentially of two main easily moulded sections, a front section, and a rear section. These two sections are joined longitudinally to constitute the basic car body structure, the juncture being made along minimal areas which are exposed to view from without the car body, thereby to minimize the labor required to smooth over the lines of juncture.

Further, the two main body sections are provided with a pair of longitudinal open shell extensions each of which, when joined endwise with a similar extension of the other section and closed by a panel extending substantially the full length of both thus joined shell extensions, forms a longitudinally extending tubular element. This element will be found to provide excellent rigidity for the car body. These shell extensions, moreover, are moulded and laid up in such a manner as to enable them to be bolted directly to the framing and platform of the car chassis. Thereby, the necessity of additional framing and means to secure the car body to the chassis is obviated.

The preferred embodiment of the invention is illustrated in the accompanying drawings in which:

Fig. 1 is an exploded perspective view of a car body, constructed in accordance with the present invention, showing its relation to a Volkswagen chassis for which this particular car body is designed.

Fig. 2 is an exploded perspective view of the front section and of the pieces which are incorporated therein.

Fig. 3 is a perspective view of a member which is employed to provide the left front wheel well.

Fig. 4 is an exploded perspective view of the rear section and of the pieces which are incorporated therein.

Fig. 5 is a perspective view of part of the rear of the after section with the closure panel in place.

Fig. 6 is a perspective view of a member which is employed to provide the left rear wheel well.

Fig. 7 is a section taken on the line 7—7 of Fig. 1.

The embodiment of the invention illustrated in the drawings is constructed in the following manner:

First, there are separately moulded of a synthetic resin, preferably a polyester, two half sections, 10, 12, section 10 being the forward half, and section 12, the rear half.

The moulding of these two sections is accomplished in a manner well understood in the plastic art. Briefly, this comprises the following steps:

(a) The female mould is coated with a thin layer of mould paste and polished, in order to insure that a water soluble release film, which is next sprayed over the mould surface, adheres to the moulded part and not to the mould.

(b) A gel coat of catalyzed resin is further applied over the mould surface, by spraying or brushing.

(c) Glass mat and cloth, cut to pattern, are laid over the mould section which is to be worked.

(d) Catalyzed polyester resin, with M.E.K. peroxide and one or more promoters, is applied to the glass mat and cloth worked in until these latter are thoroughly saturated. This application may be accomplished by spraying or simply by slopping the fluid resin out from a suitable small open-topped container. In working the resin into the glass mat and cloth, great care must be taken to remove all air from the lay-up.

(e) The resin is workable for about 35–40 minutes, and then begins to set. It is left in the moulds for 4 or 5 hours until cured.

(f) The moulded part is then removed from the mould and the release film is then washed off the part.

Further curing may actually continue for some days, although the moulded parts may be further worked upon in the manner hereinafter explained, immediately after removal from the moulds.

Upon being removed from the moulds (not shown), the two shell sections 10, 12 are inserted in a suitable jig (also not shown) which is adapted to coalign the two shell sections and to bring the ends 14, 16 and 18, 20 of the door threshold projecting portions 22, 24 and 26, 28, respectively, into abutment. The jig into which the two sections 10, 12 are placed is arranged to dispose these sections in such a manner that their undersides lie in a comon horizontal plane A—A, and, by means of locating rails, dowels and clamps (not shown), to locate them in respect of the whole door area prior to bonding, in such a manner as to insure fitting of doors and windows.

The abutting ends 14, 16 and 18, 20 are joined by bonding them together by means of a glass mat or cloth which is saturated with polyester resin. Preferably, the abutting faces of these ends are cut at an angle to increase the extent of contact, thereby to improve the juncture.

It should be noted at this point that when the sections 10, 12 come from their moulds, they define a pair of channel-like cavities 30, 31, respectively, inside of each of their pairs of projecting portions 22, 24, and 26, 28.

When the edges 14, 16 and 18, 20 are thus brought together and secured, each of the two sets of cavities 30, 31 defined by abutting projections 22, 24 and 26, 28, merges into a single rectilinear cavity 36. This cavity 36 extends forward from the after bulkhead 34, which is moulded integrally as a part of the rear shell section 12.

The outside surfaces of the line of juncture of the two shell sections 10, 12 are ground and polished to eliminate any ridges or rough spots which may appear where the ends 14, 16 and 18, 20 are joined.

After the two shell sections 10, 12 have been bonded together in the manner above described, the complete body is removed from the bonding jig and transferred to an assembly jig. This latter jig, for the embodiment of the invention illustrated in the drawings, essentially consists of a Volkswagen platform chassis indentical to the chassis outline which is dotted in, in Fig. 1, but without the running gear. The front "I" beam (similar to 37 in Fig. 1) is welded to a rigid steel tube support frame (not shown) which positions the chassis in the same altitude and height above the ground or decking, as do the wheels of a conventional chassis. The chassis of the assembly jig further differs from that dotted in Fig. 1, in that the floor pans 39, 41 on each side of the center tube 43 are cut away to provide room for men doing the actual assembly work. It will be appreciated that by assembling the body upon such a jig, the body will fit into any standard Volkswagen chassis.

A forward cockpit liner 40, is next cemented in place by bonding it into the forward shell section 10. This liner 40 is itself a moulded polyester shell of the configuration shown in Fig. 2, and fits in the forward section 10 just under the integral dashboard 42. This cockpit liner 40 includes a pair of flanges 45a, 45b, side walls 47a, 47b, and rear vertical walls 49a, 49b. The side walls 47a, 47b bridge the gap between the two shell extension edges 80, 82, and are bonded thereto.

When thus positioned and secured in the forward body half, the flanges 45a, 45b become a fore-and-aft locating flange which is employed to position the completed body upon a chassis.

The forward section is completed by riveting in place within the shell 10 the front wheel well panels 44 and the gas tank, battery and tire tray 46, and then bonding these parts to the inside of the body shell. Polyester saturated glass mats or cloth tapes are employed on all internal unexposed joints. Where an internal panel is bonded to the shell itself, epoxy putty is used since the shrinkage of polyester resin after exotherm may produce ripples in the shell surface. Panels 44 each are integrally moulded with a pair of transverse vertical bulkheads 48, 50.

A hood 52 serves to cover the openings 54 defined by the section 10, and a windshield 55 is suitably mounted on the shell section 10 forwardly adjacent the cockpit 56.

The rear body section is then similarly finished by riveting in place the bulkhead 58 which defines the engine compartment 60, and the rear wheel panels 62 with their integrally moulded transverse vertical bulkheads 64, 66. After being thus positioned, these elements are then bonded to adjacent surfaces.

A rear deck cover 68 is next hinged at its forward edge 70 to the inside of the rear shell section 12, and door hinges 72 are inserted through orifices 74 in the faces 76 of the after shell section 12 and appropriately mounted inside said section.

At this point, each of the merged cavities 36 is closed by a longitudinal vertical bulkhead 78. The latter extends from the rear wall 49a or 49b to the after bulkhead 34, being laid in against the inwardly facing edges 80, 82 of each thus abuttingly joined pair of projections 14, 16 and 18, 20, and bonded to said edges and wall and bulkhead, by epoxy resin or putty. For this purpose, the edges 80, 82 are specially formed to the configuration shown in Fig. 7 to present vertical faces to which the bulkhead 78 may be readily cemented.

With the closure of each of the cavities 36 by the bulkheads 78, there is created a pair of tubular elements 79 which are integrated with both the fore and aft body sections 10, 12, and extend therebetween. These elements 79 will be found to provide excellent structural strength to the body assembly, particularly when they are fastened directly to the channel-member side edge 84 of the platform 86 of the Volkswagen chassis, for which the particular embodiment of the invention herein illustrated and described has been especially designed.

The car body is next painted with a coat of special fiberglass primer, after which the doors 90 may be mounted on the hinged mountings 72. Either a lacquer primer or enamel primer is then applied, to be followed with either a suitable lacquer or enamel to finish the body. The latter is then ready for mounting upon the Volkswagen chassis by direct fastening to the edges of the chassis platform in the manner previously described.

It may be seen from the foregoing description, taken in conjunction with the accompanying drawings, that the invention enables a large size plastic car body to be constructed without the use of unwieldly or multi-sectioned moulds. This is accomplished by separately moulding the fore and aft sections and joining these sections in the manner described. The provision of the longitudinal tubular members formed by the two shell section projections and the internal closure bulkheads, results in an assembly of great structural rigidity, particularly where these tubular members are secured directly to the car chassis platform. The body is further greatly reinforced from a structural standpoint by its network of bulkheads which define the cockpit, engine compartment, wheel wells and gas tank, battery and tire receptacles.

I claim:

1. For use with an automobile chassis, said chassis including running gear, motive power connected to drive said running gear, and a horizontal platform supported by said running gear; a plastic car body, said body comprising: a forward shell section and an after shell section, both of said sections being rigidly moulded of synthetic resin, and each of said sections being formed to seat on a portion of said platform; and having a pair of shell-like extensions, each of which extensions when adhesively joined to an oppositely directed and complementary extension of the other section, defines with the latter a continuous rectilinear channel, and a closure wall adhesively secured to each thus joined pair of complementary extensions to cover said channel, thereby to form with said extensions a longitudinally extending tubular support element.

2. For use with an automobile chassis, said chassis including running gear, motive power connected to drive said running gear, and a horizontal platform supported by said running gear, a plastic car body, said body comprising: a forward shell section and an after shell section, both of said sections being rigidly moulded of synthetic resin, and each of said sections being formed to seat on a portion of said platform, and having a pair of parallel rectilinear shell extensions; each of said extensions extending horizontally with its lower wall on a level with the bottom of the section of which it is a part, and with its outer wall in alignment with one side of the last said section, to terminate in abutment with an oppositely disposed and directed extension from the other section; said abutting terminations of said extensions being adhesively joined together and, when joined, defining an internal channel; an internal closure wall covering said channel and adhesively secured to said joined extensions thereby to constitute a longitudinally extending support element to provide rigidity to the body; said two sections and their respective joined extensions and closure walls at least partially defining a cockpit disposed substantially amidships; and said sections being secured to said platform by a series of fastener means passing both through said platform and through the bottom walls of said extensions.

3. For use with an automobile chassis, said chassis including running gear, motive power connected to drive said running gear, and a horizontal platform supported by said running gear, said platform having raised ridge-like areas extending adjacent the side edges of the platform, a plastic car body, said body comprising: a forward shell section and an after shell section, both of said sections being rigidly moulded of synthetic resin, and each of said sections being formed to seat on a portion of said platform and having a pair of parallel rectilinear shell extensions; each of said extensions extending horizontally with its lower wall on a level with the bottom of the section of which it is a part, and with its outer wall in alignment with one side of the last said section, to terminate in abutment with an oppositely disposed and directed extension extending from the other section, the bottom wall of each said extension further being contoured to fit on and over said ridge-like area to seat thereon; said abutting terminations of said extensions being adhesively joined together and, when joined, defining an internal channel; an internal closure wall covering said channel and adhesively secured to said joined extensions thereby to constitute a longitudinally extending support element to provide rigidity to the body; said two sections and their respective joined extensions and closure walls at least partially defining a cockpit disposed substantially amidships; and said sections being secured to said platform by fastener means passing both through said ridge-like areas and through the bottom walls of said extensions.

4. The plastic car body as described in claim 1 wherein at least one door is provided to close the area above one of the joined pair of shell extensions, said door being contoured to fit between said sections and being hinged to one of said sections.

5. The method of constructing a plastic body to be placed upon and secured to a car chassis having running gear, motive power connected to drive said running gear, and a horizontal platform supported by said running gear, said method comprising the steps of: moulding separately of a rigid synthetic resin, a fore shell section and an after shell section, each section being provided with a pair of lateral shell-like extension elements directed from the base of the section horizontally toward the other section and defining a rectilinear channel; mounting said sections in a common plane and in alignment with each other upon a jig in such a manner as to place the extremities of the oppositely directed elements of each section in abutment with each other thereby to constitute the adjacently disposed channels as a single continuous channel; securing said abutting extremities together by means of a resin-type adhesive; adhesively securing within said thus joined shell sections various compartmenting bulkheads; and closing each said continuous channel by adhesively securing a vertically disposed wall-like member across the edges of the inwardly extending walls of said extension elements defining said channel, thereby to provide a pair of longitudinally extending tubular supports to provide rigidity to the body.

6. The method as described in claim 5 wherein the bonding of internal unexposed joints is accomplished by the use of polyester saturated glass mats.

7. The method as described in claim 5 wherein the bonding of internal bulkheads to the shells is accomplished by the use of epoxy putty.

References Cited in the file of this patent

UNITED STATES PATENTS

| | | |
|---|---|---|
| 2,242,269 | Siebler | May 20, 1941 |
| 2,612,964 | Hobbs | Oct. 7, 1952 |
| 2,814,524 | Porsche et al. | Nov. 26, 1957 |